(No Model.) 2 Sheets—Sheet 1.
G. ROUY.
BRAKE FOR RAILWAY CARS.
No. 530,460. Patented Dec. 4, 1894.
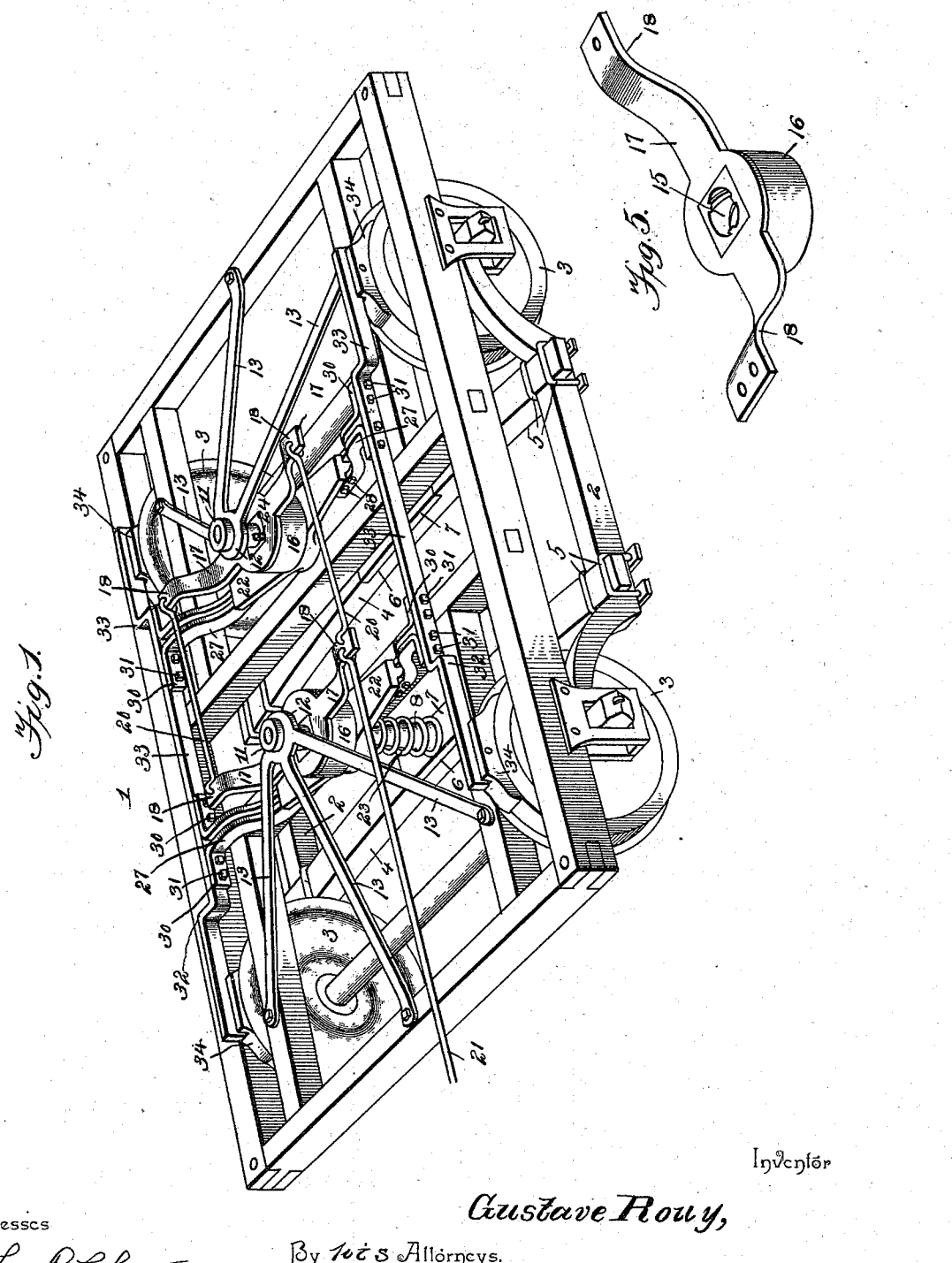
Witnesses
John C Shaw
D. ...
Inventor
Gustave Rouy,
By his Attorneys.
C A Snow & Co.

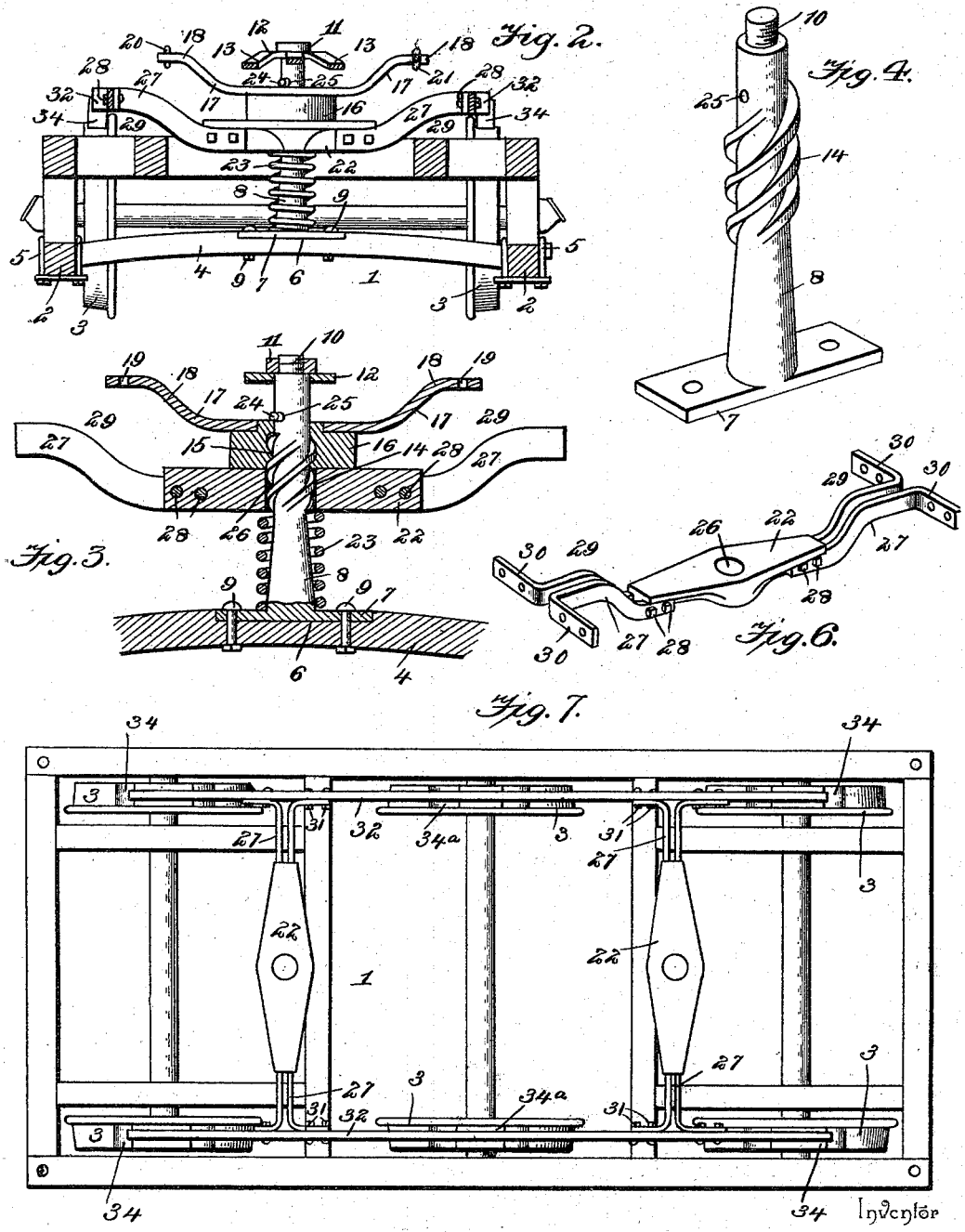

UNITED STATES PATENT OFFICE.

GUSTAVE ROUY, OF CHICAGO, ILLINOIS.

BRAKE FOR RAILWAY-CARS.

SPECIFICATION forming part of Letters Patent No. 530,460, dated December 4, 1894.

Application filed April 5, 1894. Serial No. 506,479. (No model.)

*To all whom it may concern:*

Be it known that I, GUSTAVE ROUY, a citizen of the United States, residing at Chicago, in the county of Cook and State of Illinois, have invented a new and useful Car-Brake, of which the following is a specification.

This invention relates to car brakes; and it has for its object to provide a new and useful car brake attachment that can be readily attached to and used in connection with nearly all styles of platform car trucks without interfering with the attachment of the car body to the truck.

To this end the main and primary object of the present invention is to provide a simple and powerful car brake that may be operated as an air brake, by hand, or any other suitable operating devices, and which provides means for braking the car wheels from the top in a direct line above the rail on which they travel, thereby securing the best possible frictional clamp on the wheels for almost instantly stopping a car.

With these and other objects in view which will readily appear as the nature of the invention is better understood, the same consists in the novel construction, combination and arrangement of parts hereinafter more fully described, illustrated and claimed.

In the accompanying drawings:—Figure 1 is a perspective view of a car truck equipped with a brake constructed in accordance with the present invention. Fig. 2 is a transverse sectional view thereof. Fig. 3 is an enlarged vertical sectional view similar to Fig. 2, the line of section including one of the stationary screw posts and the adjusting nut thereon. Fig. 4 is a detail in perspective of one of the stationary screw posts. Fig. 5 is a similar view of one of the adjusting nuts. Fig. 6 is a detail in perspective of one of the vertically movable cross bars with the branched attaching straps secured thereto. Fig. 7 is a top plan view of a six-wheeled car truck equipped with the herein-described brake.

Referring to the accompanying drawings, 1 designates a four wheeled car truck of the ordinary construction such as employed in connection with street or other cars and having at opposite sides thereof the lower intermediate side springs or bars 2, that are arranged between the axle boxes of the truck in the ordinary position, and said car truck is mounted to travel on the wheels 3, and is adapted to support thereon a car body in the usual manner.

At opposite points adjacent to the opposite pairs of supporting wheels of the car truck are arranged the transverse supporting beams 4. The transverse supporting beams 4, are adapted to form the main supports for the brake attachment herein described, and are securely connected at their opposite ends to the opposite lower side bars 2, of the truck, which therefore form a yielding support for the brake attachment to allow the same to yield to the movements of the car body supported on the truck, so as not to interfere or come in contact with the same. The transverse supporting beams 4, are preferably arched to properly elevate and dispose the different parts of the attachment, and are connected to the said opposite side springs or bars 2, by means of the clip bolts 5, or other suitable securing devices. At a point intermediate of their ends the transverse supporting beams 4, are provided with the recesses 6, that receive the attaching flanges 7, at the lower ends of the upright stationary screw posts 8. The lower flanged ends of the screw posts 8, are perforated to receive the securing bolts 9, that also pass through the beams 4, and securely position the said screw posts thereon.

The stationary screw posts 8, are provided at their upper extremities with the threaded pins 10, to removably receive the stop nuts 11, that serve to secure in position over the upper projected ends of the screw posts the brace collars 12, loosely embracing the upper ends of said posts and carried at the upper inner ends of opposite end brace frames consisting of a series of branch brace rods 13, suitably bolted to the top timbers of the truck at opposite ends thereof, and these opposite end brace frames, by reason of being supported slightly above the plane of the truck are necessarily yielding, or have somewhat of a spring, in order to yield to any downward movement of the stationary screw posts occasioned by a spring or yield of the transverse beams supporting the same, and these several supporting and bracing connections also additionally serve to brace the entire truck.

The stationary screw posts 8, are further provided at a point intermediate of their ends with a section of spiral threads 14, that are arranged on a long pitch, and are adapted to be adjustably engaged by the correspondingly pitched interior spiral threads 15, of the adjusting nuts or collars 16, adapted to loosely work over the threads of the screw posts. The adjusting nuts 16, are made of suitable metal capable of withstanding the wear placed thereon, and rigidly attached to the top sides of said nuts are the double cross arms 17. The double cross arms 17, extend to both sides of the nut on which they are secured and are provided with upturned extremities 18, in which are formed perforations 19, adapted to loosely receive one end of the connecting rods 20, arranged parallel with each other and serving to loosely connect the corresponding ends of the oppositely located cross arms to provide means for the simultaneous adjustment of both adjusting nuts, and to one extremity of one of said cross arms is loosely connected one end of a brake rod 21, which is adapted to be controlled by air brakes or other suitable mechanism ordinarily employed for operating car brakes.

From the above it will be seen that the oppositely disposed adjusting nuts are connected for simultaneous movement, and when moved in one direction said nuts will screw down on the threads of the stationary screw posts against the top side of the vertically movable cross bars 22, that are arranged to move on the screw posts on top of the spiral springs 23, that are coiled on the posts below the cross bars 22, and are sufficiently strong so as to elevate the entire brake attachment when it is desired to throw the brakes off, and the upward adjustment of the said cross bars and the adjusting nuts is limited by a stop pin 24, arranged in a perforation 25, in the screw posts near their upper ends.

The vertically adjustable cross bars 22, that are arranged to move on the stationary screw posts below the adjusting nuts, are preferably T-shaped in cross section and are provided with a central guide opening 26, that loosely embraces the screw posts, and to opposite ends of said cross bars are secured the opposite pairs of branched attaching straps 27. The opposite pairs of branched attaching straps 27, consist of suitable straps or strips of metal bolted at their inner ends, as at 28, to opposite sides of the vertical flanges of the cross bars 22, at opposite ends thereof, and from their connections with said cross bars the straps are curved outwardly as at 29, and are provided with the outer flanged attaching ends 30, that are adapted to be bolted by the bolts 31 to the inner sides of the opposite parallel brake bars 32. The opposite parallel brake bars 32, are provided, when used in connection with a four wheeled truck, with the inwardly disposed bends 33, so as not to interfere with the connections between the car body and the truck, and pivotally secured to said parallel brake bars 32, at a point directly over the top of each wheel of the truck, are the brake shoes 34, that are arranged for frictional engagement with the top of the car wheels in a direct line above the point of contact with the rails.

The opposite parallel brake bars 32, comprise a vertically adjustable shoe frame carrying the shoes that work over the wheels, and it will be obvious that when the adjusting nuts 16, are simultaneously adjusted or screwed downward on the screw posts, the cross bars 22, are moved downward and thereby lower the brake shoe frame consisting of the bars 32 and 22, and consequently clamp the shoes tight onto the wheel, this arrangement securing the best possible frictional clamp on the wheels for quickly stopping the car truck. When the pull on the adjusting nuts is released, the springs 23, lift the same up against the stop pins 24, and thereby lift the brake shoes from the wheels, it being of course understood that the pitch of the threads of the screw posts and the nuts are sufficiently long to admit of a large adjustment of the cross bars 22, with but a comparatively short turn of the nuts.

The herein-described attachment does not interfere at all with the support of the car body, and in fact projects but a slight distance above the plane of the top of the truck, and without material modification, the said attachment can be used in connection with six wheeled or other trucks, as illustrated in one of the figures of the drawings, in which the attachment is shown as arranged on a six-wheeled truck. In this arrangement the opposite parallel brake bars 32, are arranged directly in a line over the wheels without bend and are simply provided with an extra pair of brake shoes 34$^a$, for the extra pair of shoes, otherwise the attachment being identical with that described. It may be further observed at this point, that by reason of the vertical adjustment of the horizontal brakeshoe frame above the wheels of the truck, the curved brake shoes 34, may be made in different lengths, it being obvious that the same may be made to encircle one-third or even one-half of the circumference of the wheels and thereby secure a powerful grip on the wheels that cannot be secured by other brakes. The size, therefore, of the brake shoes may be regulated to the character of work required of them, and other changes in the form, proportion and the minor details of construction may be resorted to without departing from the principle or sacrificing any of the advantages of this invention.

Having thus described the invention, what is claimed, and desired to be secured by Letters Patent, is—

1. In a car brake, a stationary screw post, a cross bar mounted loosely on said post, a vertically adjustable brake shoe frame connected to said cross bar, an adjusting nut engaging the threads of the posts to lower said cross bar, and a spring arranged under the cross bar to elevate the same and said nut, substantially as set forth.

2. In a car brake, a vertically adjustable brake shoe frame carrying brake shoes to engage the top sides of car wheels, a suitably arranged stationary screw post, a turning adjusting nut engaging the threads of said post over a certain part of said brake shoe frame to lower the same, and separate means for raising the brake shoe frame, substantially as set forth.

3. In a car brake, the combination with a car truck; of oppositely arranged stationary screw posts, a brake shoe frame consisting of opposite parallel brake bars, the brake shoes attached to said brake bars over the wheels of the truck, cross bars mounted for vertical movement on said post and connected to said brake bars, adjusting nuts engaging the threads of said posts over said cross bars and provided with double cross arms extending to both sides thereof, connecting rods loosely connecting the corresponding ends of the oppositely located cross arms, a brake rod connected to one extremity of one of the cross arms, and springs arranged on the stationary posts under the cross bars, substantially as set forth.

4. In a car brake, the combination with a car truck; of oppositely located transverse supporting beams mounted on opposite lower side bars of the truck, stationary screw posts mounted on said supporting beams, opposite end brace frames having collars loosely receiving the upper ends of said posts, a vertically adjustable brake shoe frame consisting of parallel brake bars carrying shoes arranged to work above the car wheels, vertically movable cross bars arranged to work on said posts and connected to said parallel brake bars, adjusting nuts engaging the threads of said posts and provided with double cross arms extending to both sides thereof, connecting rods loosely connecting the corresponding ends of the oppositely located cross arms, and springs arranged on the posts under the cross bars, substantially as set forth.

5. In a car brake, the combination with a vertically adjustable brake shoe frame having a cross bar; of a stationary screw post provided with a section of spiral threads, and a removable stop pin above the threads, an adjusting nut provided with interior spiral threads engaging those of the post and arranged to work over the cross bar of the brake shoe frame, a spring arranged on the post under the cross bar of the brake shoe frame, and means for turning the nut, substantially as set forth.

6. In a car brake, the combination with a car truck; of a lower transverse supporting beam, a stationary threaded screw post provided with a lower flanged end adapted to be bolted onto said supporting beam and at its upper end with a removable stop nut, an end brace frame consisting of a series of branched brace rods adapted to be secured to the top of the truck and carrying a brace collar loosely embracing the upper end of the post under the stop nut, a vertically adjustable brake shoe frame having a cross bar working over said post, an adjusting nut arranged to engage the threads of the post over the cross bar, and a spring arranged on the post under the cross bar, substantially as set forth.

7. In a car brake, the combination with a car truck; of a vertically adjustable T-shaped cross-bar supported for vertical movement, means for adjusting said bar, opposite vertically adjustable brake bars carrying brake shoes, and opposite pairs of branched attaching straps bolted to opposite ends of the cross bar and having outer flanged attaching ends adapted to be secured to said brake bars, substantially as set forth.

In testimony that I claim the foregoing as my own I have hereto affixed my signature in the presence of two witnesses.

GUSTAVE ROUY.

Witnesses:
QUIDA J. CHOTT,
FRANK H. CULVER.